US008200085B2

(12) United States Patent
Desaulniers

(10) Patent No.: US 8,200,085 B2
(45) Date of Patent: Jun. 12, 2012

(54) OPTICAL DIGITAL TRANSMISSION FOR MULTIPLE BEAM CROSS-CONNECTION, ROUTING, AND SWITCHING

(75) Inventor: Jean-Marc (Joseph) Desaulniers, Binic (FR)

(73) Assignee: Jean-Marc (Joseph) Desaulniers, Binic (FR)

( * ) Notice: Subject to any disclaimer, the term of this patent is extended or adjusted under 35 U.S.C. 154(b) by 737 days.

(21) Appl. No.: 12/162,628

(22) PCT Filed: Jan. 30, 2007

(86) PCT No.: PCT/FR2007/000169
§ 371 (c)(1),
(2), (4) Date: Nov. 25, 2008

(87) PCT Pub. No.: WO2007/088268
PCT Pub. Date: Aug. 9, 2007

(65) Prior Publication Data
US 2009/0317081 A1   Dec. 24, 2009

(30) Foreign Application Priority Data
Feb. 1, 2006 (FR) ..................................... 06 00903

(51) Int. Cl.
*H04J 14/00* (2006.01)
(52) U.S. Cl. ........................................................ 398/49
(58) Field of Classification Search .................... 398/79, 398/99; 359/1; 353/81
See application file for complete search history.

(56) References Cited

U.S. PATENT DOCUMENTS

| 2,831,453 | A | 4/1958 | Hardesty |
| 4,447,118 | A | 5/1984 | Mulkey |
| 4,626,065 | A | 12/1986 | Mori |
| 5,481,631 | A | 1/1996 | Cahill et al. |
| 6,473,544 | B1 * | 10/2002 | Daneman et al. ................ 385/17 |
| 6,763,162 | B2 * | 7/2004 | Riester .............................. 385/18 |
| 6,907,154 | B2 * | 6/2005 | Oikawa et al. ................... 385/17 |
| 2002/0003919 | A1 * | 1/2002 | Morimoto ......................... 385/18 |
| 2004/0022480 | A1 | 2/2004 | Riester |

FOREIGN PATENT DOCUMENTS

| JP | 58 072108 A | 4/1983 |
| WO | WO 2006/008483 A2 | 1/2006 |

OTHER PUBLICATIONS

International Search Report, Jun. 4, 2007, from International Phase of the instant application.
English Translation of International Preliminary Report on Patentability Chapter II, Nov. 14, 2008, from International Phase of the instant application.

* cited by examiner

*Primary Examiner* — Jessica Stultz
*Assistant Examiner* — Tuan Nguyen
(74) *Attorney, Agent, or Firm* — Jackson Patent Law Office; Jerome D. Jackson

(57) ABSTRACT

The invention concerns an optical digital transmitting device for cross connecting, routing and switching at temporal, spatial and frequency level a plurality of electromagnetic beams. Said device uses a plurality of laser type or other low/medium power type magnetic sources, coupled to a plurality of matrix optical heads and specific delay lines of the structured waveguide type based, for example, on optical fibers, of natural crystalline or specific synthetic structure, of optical passive/active memory structure, of any combination thereof. The electromagnetic multiple beam cross connection, routing and switching function whether of the optical type or not enables it to be used in various fields in telecommunications (such as point-to-point, point-to-multipoint free-space transmission).

4 Claims, 6 Drawing Sheets

OPTICAL DIGITAL TRANSMISSION FOR MULTIPLE BEAM CROSS-CONNECTION, ROUTING, AND SWITCHING

CROSS-REFERENCE TO RELATED APPLICATIONS

This application is U.S. National Stage Entry of International Application PCT/FR2007/000169, which claims priority benefits of French Application 0600903 filed 01 Feb. 2006.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND OF THE INVENTION

The cross-connection, routing and switching in very high speed telecommunication networks, using the dense wavelength division multiplexing (DWDM) is performed by passive and/or active components, of optical, and/or optoelectronic and/or electronic type, integrating e.g. layers treatment, e.g. physical and/or network, configured/driven by application software. These systems include various devices based on micro-electromechanical mirrors with DMD/MEMS digital command, based on piezoelectric actuators, the latter based on liquid crystal or acoustic-optical crystal. Most of these technologies suffer from the induced latency, linked to electronic processing carried out through multiple components, resulting from the protocol operation obligations at each level performed for example with software, hardware or a combination of both. The challenge is to achieve an all-optical digital cross-connection/routing/switching component.

BRIEF SUMMARY OF THE INVENTION

According to an aspect of the present invention a digital optical transmission device comprises a plurality of optical rotating discs, with one or two active sides, having each a specific rotation speed, distributed over a plurality of rotation axis, of the optical rotating discs, into the different multi-axis variants. Each of the optical rotating discs having a specific arrangements of overhanging facets or embedded cavities, equipped with mirrors or filters, distributed on each the optical rotating disc active side according to a plurality of tracks, sectors, sections, quadrants, over the surface or embedded, providing a plurality of specific combinations of reflections, transmissions, refractions or diffractions.

Each of the overhanging facets or embedded cavities supports mirrors or filters housed, overhanging or embedded into the optical rotating discs, providing a specific optical function through a specific spatial or angular addressing by cavity or mirror or filter leap, section leap, track leap, sector leap, quadrant leap, side leap, optical rotating disc leap or going-through, axial translation at matricial group of beam level, insertion/extraction into delay lines, for resynchronization of the different signals using a plurality of multi-frames, applying a certain angle of deflection to the incident/incoming transmission laser beam. An organization of the overhanging facets or embedded cavities is equipped with a plurality of mirrors or filters having each a specific position and orientation, associated with a specific incremental angle sequence of mirrors or filters, specific to each track of the optical rotating discs, that may be different from one the optical rotating disc to another, according to the configuration of the device, enabling intra-disc or inter-discs switching/routing/cross-connection of the optical rotating discs, as to say the passage of one or several beams, e.g. through the optical rotating discs from one side to the other, in order to reach the mirrors or filters at a specific position, e.g. located on another track through a track leap or sector leap, or on the opposite side of the same the optical rotating discs by side leap, or on the next the optical rotating disc in an aligned configuration or in staggered rows configuration by the optical rotating disc leap. A plurality of specific optical delay lines, of passive or active types, comprising a waveguide, such as an optical fiber of a certain length wrapped around a coil, made of a specific natural or synthetic crystalline structure material, applying to the transmitted wave a specific delay on the propagation time within the waveguide, enabling the control of the signal's overall propagation time and thus of their synchronization within the multi-frames, A plurality of electromagnetic beam flow at the input, associated with a plurality of alignment points of the cavities or mirrors or filters located on the optical rotating discs surface, carrying the same payload, separated or replicated into a plurality of identical beams, each of them being then processed simultaneously within the digital optical transmission device, through physically separated optical light-paths, then collected/reassembled/recombined at the output in order to form a single stream/flow, enabling path flow continuity between the input stage and the output stage, by preserving the data integrity, as well as the synchronization between signals carried by each beams, that may be resulting from optical path length difference, using a plurality of delay lines, in order to achieve, in both directions of electromagnetic flow propagation within the device, mixing/routing/switching at time, spatial and frequency level, on a plurality of electromagnetic beams transmitting data or symbols, at very high-speed (e.g. type DWDM).

DESCRIPTION OF PREFERRED EMBODIMENTS

The current invention concerns an optical digital transmission device, mono or bi-directional, allowing cross-connection, routing and switching at time, spatial and frequency level, of a plurality of electromagnetic beams carrying data or symbols. The device uses a plurality of electromagnetic sources such as laser or other low/medium power sources, coupled to a plurality of optical matrix heads and a plurality of specific delay lines based on, for example optical fibers.

The all-optical cross-connection/routing/switching function, based on light beams, enables it to be use in various fields in telecommunications (such as point-to-point transmission, point-to-multipoint, for example in a confined environment such as waveguide or in free-space).

The principle of the invention relates to a device allowing the cross-connection/routing/switching in optical telecommunication networks, based on multi-sections optical rotating discs, single or double-sided, and a combination of specific geometry mirror/filters elements to permit a spatial/angular particular addressing, which depend on the desired effect: cross-connection/routing/switching level, cavity leap, sector leap, section leap, optical rotating disc leap, insertion into a delay line and recovery of the beam at the delay line output.

According to the different possible configurations, this digital optical transmission device can be completed at the input or output stage, e.g. with a plurality of optical matrix heads of crown/pyramid type, or block of mirrors/filters, or with a plurality of optical deviation periscopes. This device of matrix head is in charge of spatially or frequency addressing of the payload to the right conduit, materialized by the "spatial" and "time" collimation through a series of reflections/transmissions between different virtual conduits/pipes, coupled, for example, at a specific moment, to ensure the gaussian beams effective propagation. This device is supplemented by a plurality of delay lines to reprocess, through a number of multi-frames, the resynchronization of different signals. A plurality of simultaneous streams, e.g. two, three or more, with the same payload, will power the device, ensuring flow continuity and information integrity. The use of passive elements such as mirror/filter allows input/output reversibility of the device (bidirectional simultaneous transmission).

Figure 1:
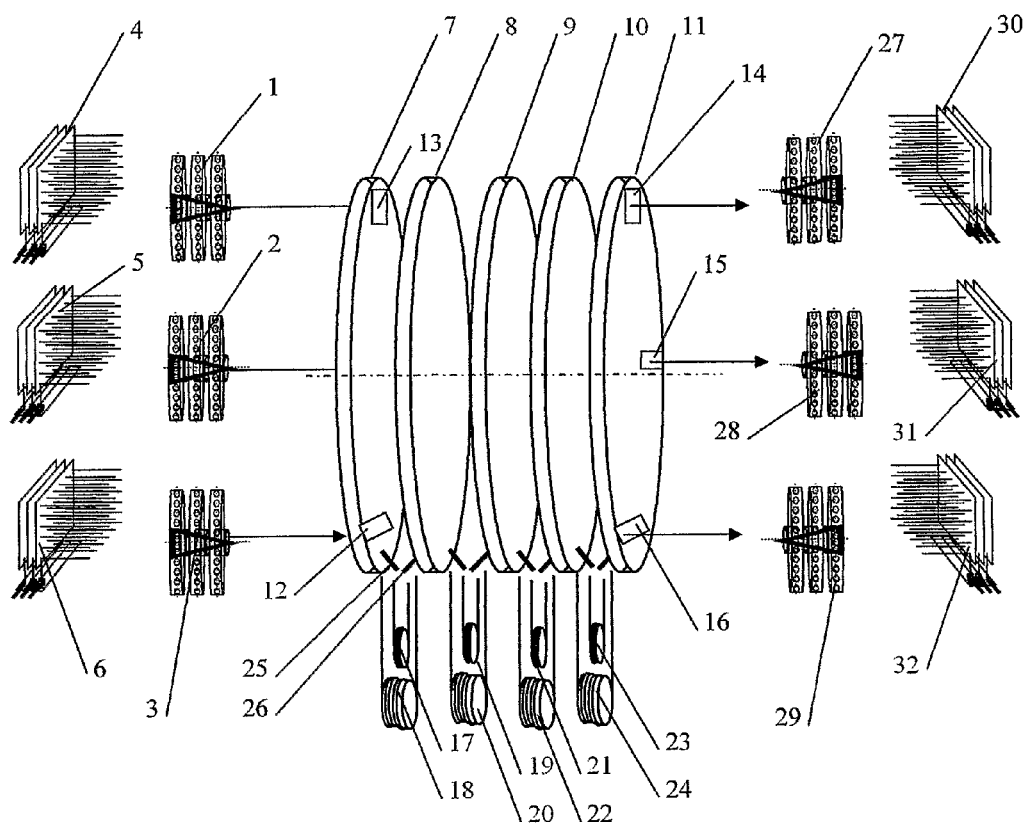
FIG. 1 illustrates, in perspective, the digital optical transmission composed of a certain number of optical rotating discs, a certain number of delay lines, and a certain number of sources organized or not, e.g. as a matrix, e.g. with an optical matrix head of a crown/pyramid or block of mirrors/filters type.

As a reference to the drawings, the digital optical transmission device, represented in perspective (FIG. 1), consist of:

an input stage, e.g. of a certain number of optical matrix heads, e.g. (1), (2) and (3) composed of a certain number of rings and a certain number of central pyramid-shaped elements, and/or, e.g. (4), (5) and (6) of a certain number of structured mirrors/filters stages, e.g. of matrix structure;

a stage of a digital optical transmission composed of a certain number of optical rotating discs, e.g. (7), (8), (9), (10) and (11), parallel or not, aligned or not, shared out onto a certain number of rotation axes in the same plane or not, each with a specific rotation speed, on which are arranged, according to a specific organization, a certain number of mirrors/filters e.g. (12), (13), (14), (15) and (16);

a certain number of delay lines, e.g. (17), (18), (19), (20), (21), (22), (23), (24), and (85) addressed or not through a certain number of complementary mirror/filters e.g. (25) and (26);

and an output stage, e.g. a certain number of optical matrix heads, e.g. (27), (28) and (29) composed of a certain number of rings and a certain number of central pyramid-shaped elements, and/or e.g. (30), (31), and (32) of a certain number of structured mirrors/filters stages, e.g. matrix structure.

According to the achievement variants, the input stage and the output stage may be identical or not. By means of a control of the specific rotating speeds of the different optical rotating discs, and to a fast steering electronic, the device performs,— with a specific combination of cavities/mirrors/filters/delay line at any given moment—a particular angular addressing of the output stage resulting of the different successive transmissions reflections done simultaneously by a certain number of beams during the crossing of the device and by the incidence angle of a certain number of beams of the input stage.

Figure 2:
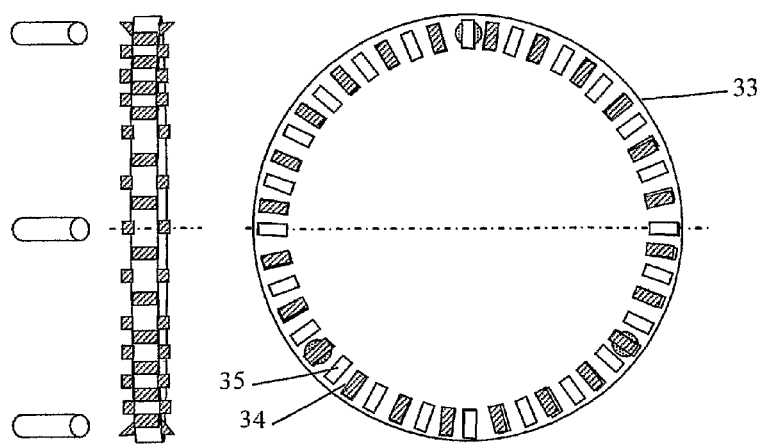
FIG. 2 illustrates, in a sectional view and a front view, a possible architecture of an optical rotating disc, part of the digital optical transmission.

According to the possible achievement variant (FIG. 2), an optical rotating disc (33) for digital optical transmission is made of a certain number of mirrors/filters (34) put into the device or at the surface, with a specific geometry, and/or made of a certain number of cavities (35), with or without bottom. All these cavities and mirrors/filters are spread over both sides of the optical rotating discs, according to a certain number of sectors, sections, quadrants. These are superposed or not, removable or not.

Figure 3:
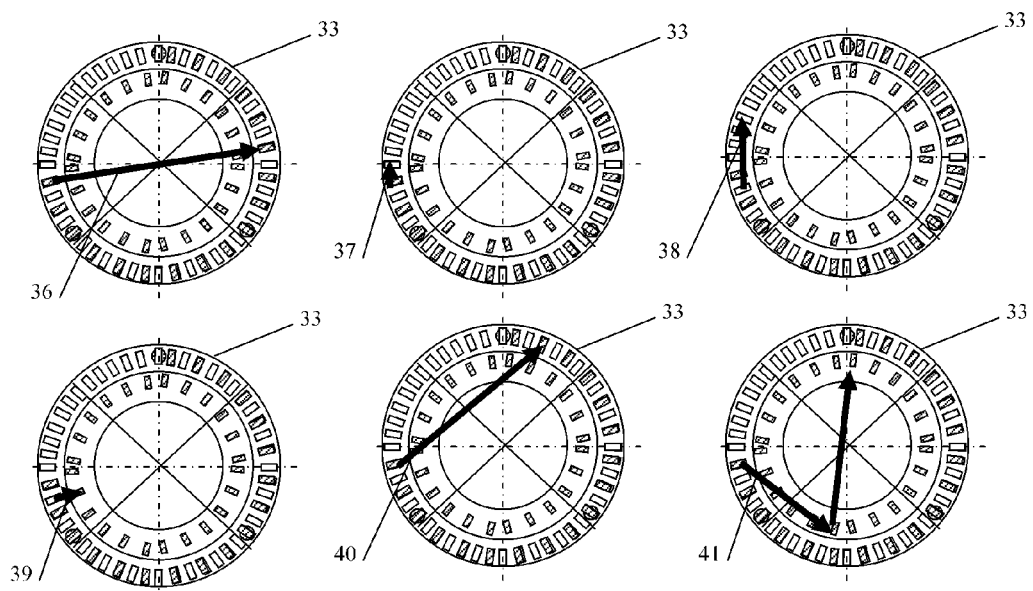
FIG. 3 illustrates, in a front view, a certain number of possible light beams paths on one side of an optical rotating disc.

On one side (FIG. 3) of an optical rotating disc (33), the organization and specific orientation of the mirrors/filters on the different sectors allow a certain number of incident beams to follow a certain number of possible paths, e.g. axial translation (36), cavity (78)/mirror/filter leap (37), section leap (38), sector leap (39), quadrant leap (40) or any combination (41). Similarly (FIG. 4), the cavities organization with or without bottom, supplemented by a certain number of mirrors/filters having themselves a specific orientation, on both sides of optical rotating discs, e.g. (33) and (42), constituting the digital optical transmission device, allows a certain number of beams, side leap, e.g. (43) and (44), optical rotating disc leap and/or crossing, e.g. (45), (46) and (47), the integration and/or extraction (48) in a delay line. Thus, at any given moment, each beam coming from the input stage is guided by a specific combination of successive reflections/transmissions through the digital optical transmission device to finish with a specific incidence angle on the output stage.

Figure 4:
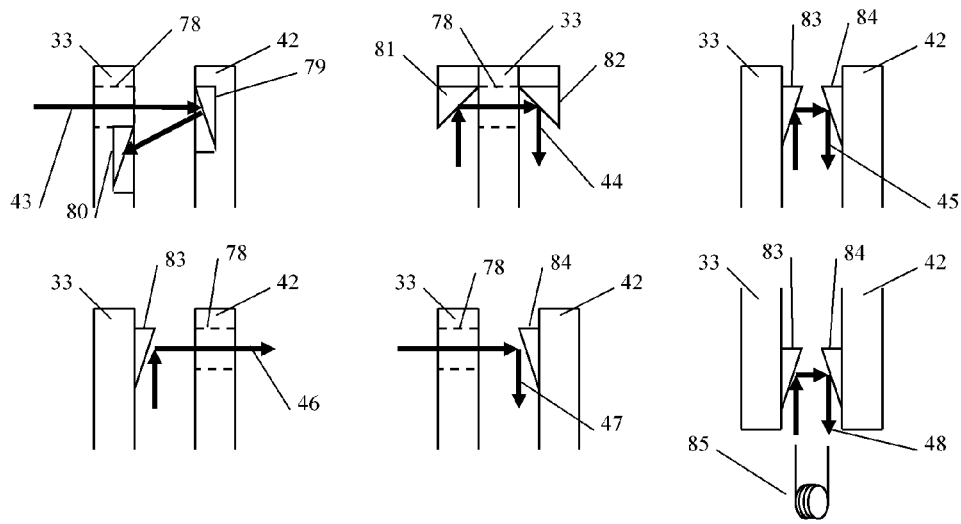
FIG. 4 illustrates, in a sectional view, possible cavities variants allowing the flow of a certain number of beams on both sides of an optical rotating disc.

FIG. 4 shows overhanging facets (81), (82), (83), (84), embedded cavity (79), and mirror or filter (80).

Figure 5:
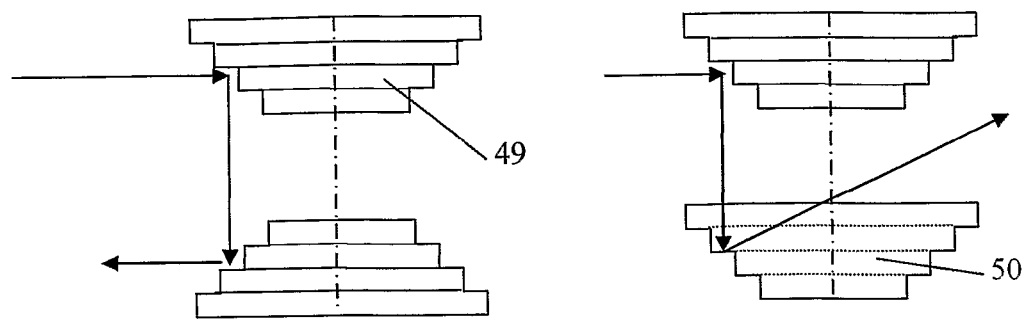
FIG. 5 illustrates, in a sectional view, a digital optical transmission variant achieved through a certain number of optical rotating discs with different heights of sectors.

Another alternative of the optical rotating discs (FIG. 5) is to achieve a certain number of sectors with different heights. The optical rotating disc, used on the external (49) or internal side (50), allows then the incident or emerging beams treatment on the edge of each stacked track.

Figure 6:
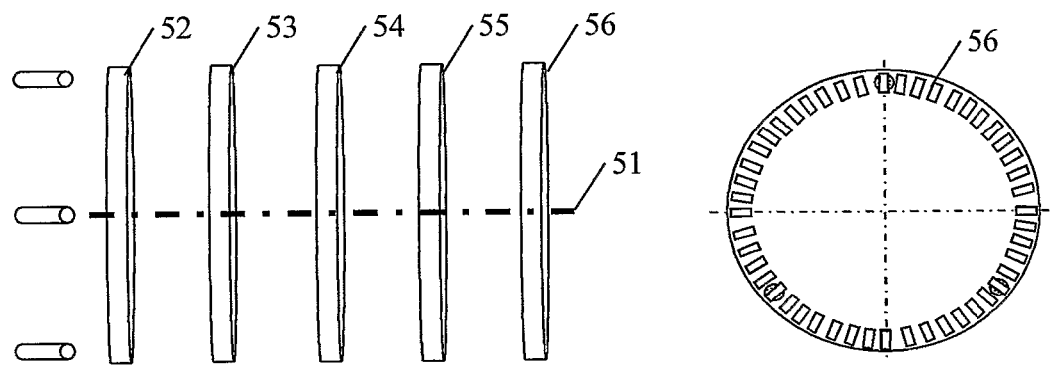
FIG. 6 illustrates, in an above and front view, a one axis structure of the digital optical transmission consisting of a certain number of optical rotating discs.

Depending on the obstruction constraints and/or on the desired cross-connection/routing/switching combinations number, a certain number of optical rotating discs, e.g. (FIG. 6) may be arranged along an axis (51). This figure (FIG. 6) illustrates e.g. a possible distribution along an axis of a certain number of optical rotating discs, e.g. (52), (53), (54), (55) and (56).

A possible alternative is the creation of a multi-axes digital optical transmission, where a certain number of optical rotating discs are shared out into staggered rows or not, on a certain number of rotation axes. Optical rotating discs may be coplanar or not, overlapped or not.

Figure 7:
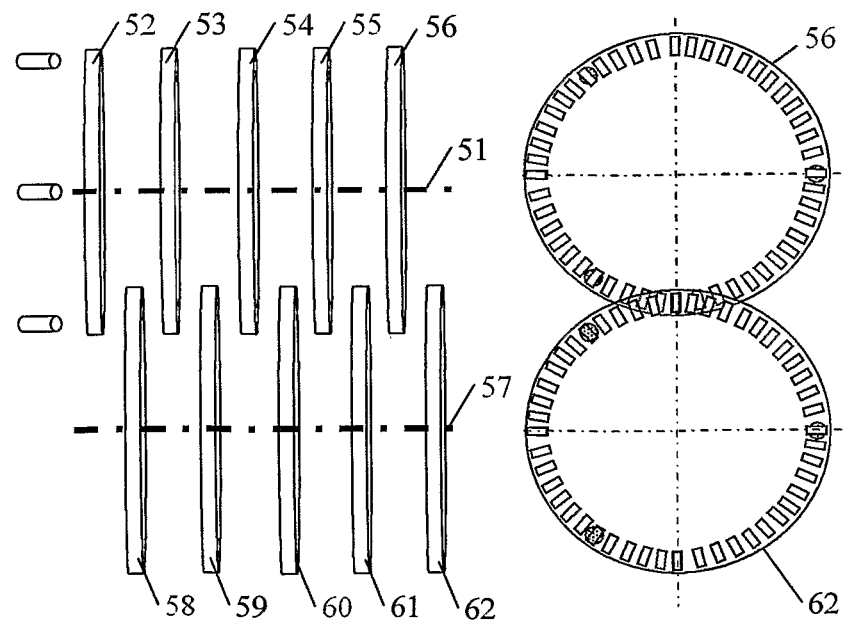
FIG. 7 illustrates, in an above and front view, a two axes structure variant of the digital optical transmission.

Among the different possible variants, the digital optical transmission (FIG. 7) has two rotation axes (51) and (57), on which is positioned a certain number of optical rotating discs, e.g. (52), (53), (54), (55) and (56), on the rotation axis (51) and (58), (59), (60), (61) and (62) on the rotation axis (57). Optical rotating discs are partially overlapped, in order to achieve an alignment in a certain number of points of the cavities/mirrors/filters between two optical rotating discs with a different axis, e.g. (56) and (62), or they are on the same plane and specific mirrors/filters realize the leaps of the optical rotating discs. All the optical rotating discs turn at the same speed or not, the latter being constant or not.

Figure 8:
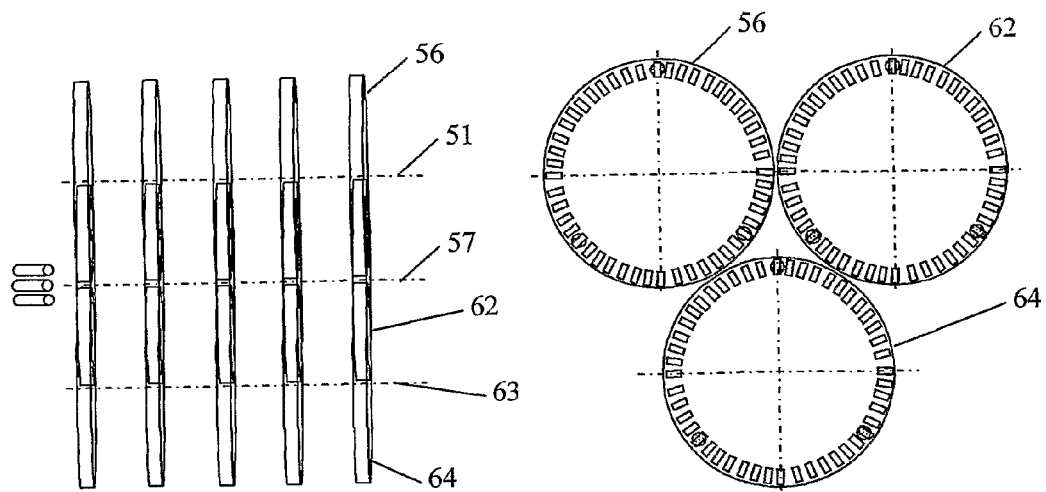
FIG. 8 illustrates, in an above and front view, a three axes structure variant of the digital optical transmission.
Figure 9:
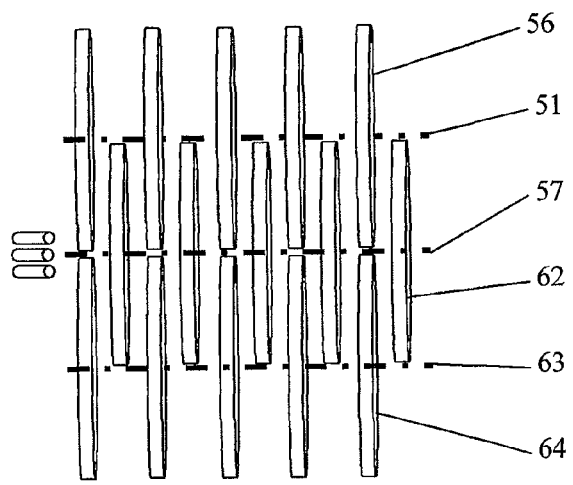
FIG. 9 illustrates, in an above view, another three axes structure variant of the digital optical transmission.

Another alternative (FIG. 8) and (FIG. 9) is the creation of a multi-axes digital optical transmission with, e.g. three rotation axes (51), (57) and (63). Several configurations of the rotation axes of the optical rotating discs are then possible, e.g. on the same plane without overlap (FIG. 8) where the optical rotating discs of the same plane, e.g. (56), (62), and (64), include a certain number of mirrors/filters allowing leaps between the different sides of a single optical rotating disc and/or leaps onto optical rotating discs, placed towards each other or not.

Figure 10:
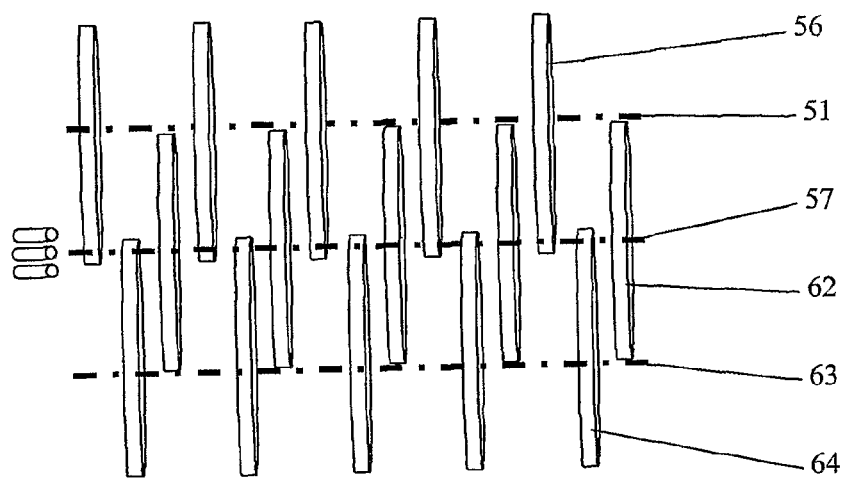
FIG. 10 illustrates, in an above view, another three axes structure variant of the digital optical transmission.

Among the other possibilities offered by this multi-axes configuration type, optical rotating discs can be: on the same plane, e.g. (FIG. 8), or partially overlapping, e.g. halfway (FIG. 9) and (FIG. 10). Optical rotating-discs being all on different planes, e.g. in staggered rows (FIG. 10), or (FIG. 9), include a certain number of axes, e.g. (51) and (63), allowing the positioning of a certain number of optical rotating discs on the same plane, e.g. (56) and (64), facing a certain number of other optical rotating discs, e.g. (62).

Figure 11:
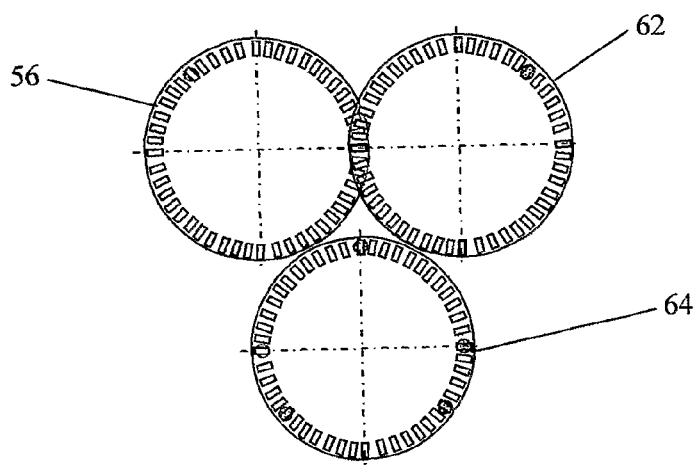
FIG. 11 illustrates, in a front view, another three axes structure variant of the digital optical transmission, where two of the three optical rotating discs are partially overlapped.

Similarly, it is possible to achieve a configuration (FIG. 11), where a number of optical rotating discs, e.g. two (56) and (62), are partially overlapped in order to superpose their sectors, completed with a number of other optical rotating discs, e.g. (64), overlapping none of the previous discs.

Figure 12:
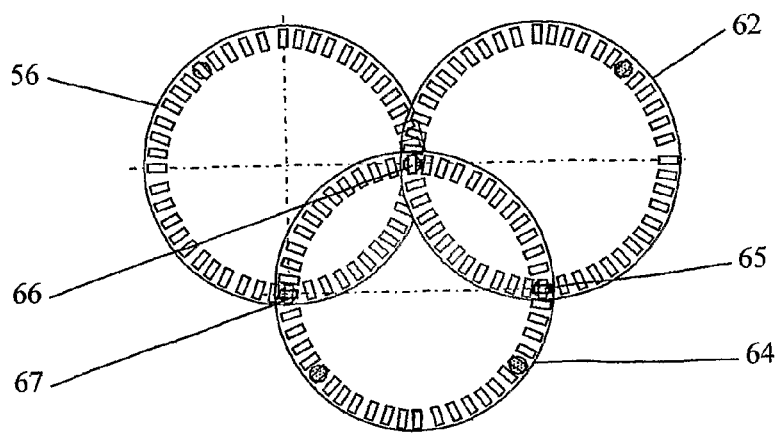
FIG. 12 illustrates, in a front view, another three axes structure variant of the digital optical transmission where the three optical rotating discs are partially overlapped.

Another alternative (FIG. 12) is the overlap of a certain number of optical rotating discs, e.g. three (56), (62) and (64), to achieve a certain number of alignment points of the cavities or mirror/filters on the sides of the optical rotating discs, e.g. (65), (66) and (67).

Figure 13:
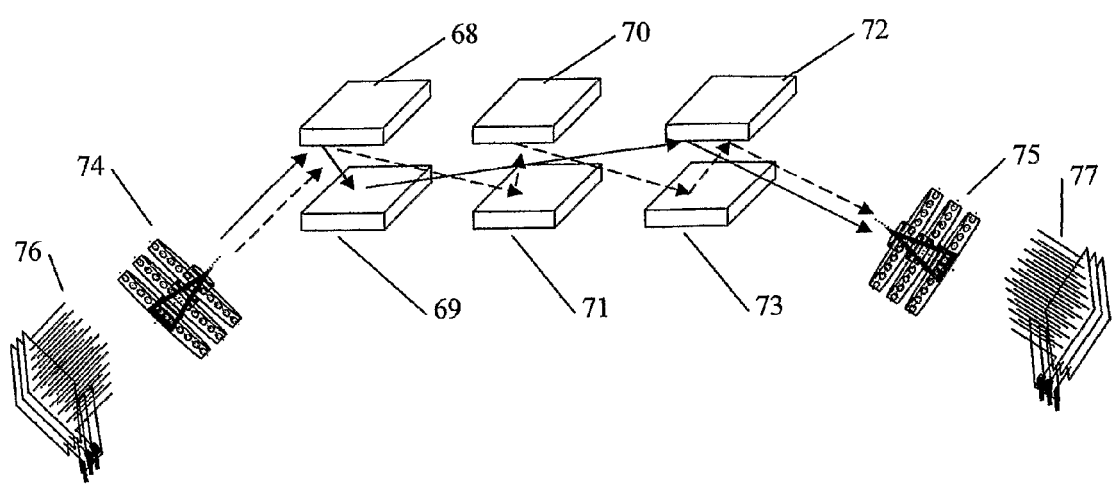
FIG. 13 illustrates, in perspective, a variant of the digital optical transmission composed of MEMS (micro-electro-mechanical systems) mirror elements.

Depending on the availability and performance of the different possible technologies, the cross-connection, routing, switching at a spatial, time and frequency level, achieved by optical rotating discs, can be replaced and/or supplemented by a certain number of micro-electro-mechanical mirrors, liquid crystal, polygonal scanner, etc. The digital optical transmission (FIG. 13) is carried out, e.g. with a certain number of micro-electro-mechanical mirrors matrices, e.g. (68), (69), (70), (71), (72) and (73), which reflect the incident beams coming from the input stage, e.g. an optical matrix head of the crown/pyramid (74) type or block of mirrors/filters (76), to the output stage, e.g. an optical matrix head of the crown/pyramid (75) type or block of mirrors/filters (77), with a certain number of specific angles resulting from a series of reflections on a certain number of matrices with specific guidelines at a given moment. An electronic control permits to select this specific addressing combination allowing a cross-connection/routing/switching of the beams at the output on an optical matrix head or not.

Depending on the alternatives, the digital optical transmissions and/or optical matrix heads, e.g. of the crown/pyramid (75) type or block of mirrors/filters (77), are supplemented or not by a certain number of optical deviation periscopes. The device of digital optical transmission, with a combination of increasing deflection angle on the mirrors/filters of one side, and of increments of that angle between different successive optical rotating discs, e.g. 1 degree for the first optical rotating disc, 5 degrees for the second, 10 degrees for the third . . . , achieves, with a series of specific combinations of successive reflections/transmissions, an angular commutation device of a certain number of beams.

The invention claimed is:

1. A digital optical transmission device comprising:
   a plurality of optical rotating discs, whose relative dynamic position are selectively aligned, selectively parallel or, selectively in staggered row, depending on applications, each having a specific rotation speed, distributed over a certain number of rotation axis of the optical rotating discs, into different multi-axis variants, each of the optical rotating discs having a specific arrangements of overhanging facets or embedded cavities, equipped with mirrors or filters, distributed on each the optical rotating disc active side according to a plurality of tracks, sectors, sections, quadrants, over the surface or embedded, providing a plurality of specific combinations of reflections, transmissions, refractions or diffractions, each of the overhanging facets or embedded cavities supporting mirrors or filters housed, overhanging or embedded into the optical rotating discs, providing a specific optical function through a specific spatial or angular addressing by cavity or mirror or filter leap, section leap, track leap, sector leap, quadrant leap, side leap, optical rotating disc leap or going-through, axial translation at matricial group of beam level, insertion/extraction into delay lines, for resynchronization of the different signals using a plurality of multi-frames, applying a certain angle of deflection to the incident/incoming transmission laser beam, an organization of the overhanging facets or embedded cavities, equipped with a plurality of mirrors or filters having each a specific position and orientation, associated with a specific incremental angle sequence of mirrors or filters, specific to each track of the optical rotating discs, that may be different from one the optical rotating disc to another, according to the configuration of the device, enabling intra-disc or inter-discs, switching/routing/cross-connection of the optical rotating discs, as to the passage of a beams through the optical rotating discs from one side to the other, in order to reach the mirrors or filters at a specific position, located on another track through a track leap or sector leap, or on the opposite side of the same the optical rotating discs by side leap, or on the next the optical rotating disc in an aligned configuration or in staggered rows configuration by the optical rotating disc leap, a plurality of specific optical delay lines of passive or active types, comprising a waveguide, such as an optical fiber of a certain length wrapped around a coil, made of a specific natural or synthetic crystalline structure material, applying to the transmitted wave a specific delay on the propagation time within the waveguide, enabling the control of the signal's overall propagation time and thus of their synchronization within the multi-frames, a plurality of electromagnetic beam flows at the input, associated with a plurality of alignment points of the cavities or mirrors or filters located on the optical rotating discs surface, carrying the same payload, separated or replicated into a plurality of identical beams, each of them being then processed simultaneously within the digital optical transmission device, through physically separated optical light-paths, then collected/reassembled/recombined at the output in order to form a single stream/flow, enabling path flow continuity between the input stage and the output stage, by preserving the data integrity, as well as the synchronization between signals carried by each beams, that may be resulting from optical path length difference, using a plurality of delay lines, in order to achieve, in both directions of electromagnetic flow propagation within the device, mixing/routing/switching at time, spatial and frequency level, on a plurality of electromagnetic beams transmitting data or symbols, at very high-speed, type DWDM.

2. A digital optical transmission device according to claim 1 characterized by input beams issued from a plurality of the optical matrix heads performing: spatial addressing of crown/pyramid type, or frequency addressing, where according to the variants, output beams ends onto a plurality of the optical matrix heads, performing the spatial addressing or the frequency addressing.

3. Digital optical transmission device according to claim 1 characterized by the optical rotating discs replaced or supplemented by a plurality of mechanisms, enabling, to reflect a beam, components of the micro-electro-mechanical mirror's type, according to a specific organization, on line, in staggered rows, completed at the input or at the output by a plurality of the optical matrix heads, e.g. of the crown/pyramid type or the block of mirrors/filters type, and a plurality of optical deviation periscopes to reduce the size of the device.

4. A digital optical transmission device according to claim 1 characterized by variants of the optical rotating discs equipped with a plurality of levels enabling to have incidents or emerging light beams on the edge of each track/sector, where useful/active sides of the optical rotating disc are, depending on the configurations, internal or external, with the variants supplemented or not by an optical deviation periscope.

* * * * *